(12) United States Patent
Rikiso et al.

(10) Patent No.: US 12,230,957 B2
(45) Date of Patent: Feb. 18, 2025

(54) ELECTRIC POWER NETWORK AND METHOD OF CHANGING ELECTRIC POWER NETWORK

(71) Applicant: FURUKAWA ELECTRIC CO., LTD., Tokyo (JP)

(72) Inventors: Masahiro Rikiso, Tokyo (JP); Sumio Kachi, Tokyo (JP); Hideto Nakamura, Tokyo (JP); Kengo Nakao, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 274 days.

(21) Appl. No.: 17/804,703

(22) Filed: May 31, 2022

(65) Prior Publication Data

US 2022/0294214 A1 Sep. 15, 2022

Related U.S. Application Data

(63) Continuation of application No. PCT/JP2020/043964, filed on Nov. 26, 2020.

(30) Foreign Application Priority Data

Dec. 3, 2019 (JP) .................. 2019-218832

(51) Int. Cl.
*H02J 1/10* (2006.01)
*H02J 7/00* (2006.01)
*H02J 7/34* (2006.01)

(52) U.S. Cl.
CPC .............. *H02J 1/10* (2013.01); *H02J 7/0013* (2013.01); *H02J 7/34* (2013.01); *H02J 2207/20* (2020.01)

(58) Field of Classification Search
CPC ........ H02J 7/34; H02J 2207/20; H02J 7/0013; H02J 1/10

(Continued)

(56) References Cited

U.S. PATENT DOCUMENTS 9,013,902 B2  4/2015 Abe
2011/0199039 A1*  8/2011  Lansberry ............... H02M 1/32
                                                                  323/284

(Continued)

FOREIGN PATENT DOCUMENTS

CN      209516643 U   10/2019
JP      2011-61970 A   3/2011

(Continued)

OTHER PUBLICATIONS

International Search Report issued Feb. 9, 2021 in PCT/JP2020/043964, filed on Nov. 26, 2020, 2 pages.

(Continued)

*Primary Examiner* — Michael R. Fin
(74) *Attorney, Agent, or Firm* — Oblon, McClelland, Maier & Neustadt, L.L.P.

(57) ABSTRACT

An electric power network includes: a plurality of power routers each including a plurality of power ports; a plurality of interconnection lines configured to connect the power routers in a grid manner via the power ports; and an electric power apparatus configured to consume or supply electric power, the electric power apparatus being connected to a power port that is included in at least one of the power routers and that is not connected to any of the interconnection lines. At least one of the power ports of each of the power routers is set as a dependent port for which characteristics of direct-current power to be input or output are not controlled.

18 Claims, 10 Drawing Sheets

(58) Field of Classification Search
USPC .......................................................... 307/19
See application file for complete search history.

(56)  References Cited

U.S. PATENT DOCUMENTS

| | | |
|---|---|---|
| 2013/0088084 A1 | 4/2013 | Szu |
| 2015/0349524 A1 | 12/2015 | Ichino et al. |
| 2015/0355666 A1 | 12/2015 | Ichino |
| 2016/0049794 A1 | 2/2016 | Liu et al. |
| 2016/0218516 A1* | 7/2016 | Kobayashi ............. G05B 19/10 |
| 2016/0334822 A1 | 11/2016 | Kobayashi |
| 2018/0270168 A1 | 9/2018 | Charette |
| 2018/0375339 A1 | 12/2018 | Sharifipour et al. |

FOREIGN PATENT DOCUMENTS

| | | |
|---|---|---|
| JP | 2014-138452 A | 7/2014 |
| JP | 2015-226365 A | 12/2015 |
| JP | 2016-127726 A | 7/2016 |
| WO | WO 2014/033892 A1 | 3/2014 |

OTHER PUBLICATIONS

Abe, et al., "Digital Grid: Communicative Electrical Grids of the Future", IEEE Transactions on Smart Grid (vol. 2, Issue: 2, Jun. 2011, 8 Pages.

Combined Taiwanese Office Action and Search Report issued on Jan. 6, 2023 in Taiwanese Patent Application No. 109142191 (with English translation), 16 pages.

Indian Office Action issued Jun. 6, 2023 in Indian Application 202247031409, (with English translation), 7 pages.

Taiwanese Office Action issued Aug. 15, 2022 in Taiwanese Patent Application No. 109142191 (with unedited computer generated English Translation), 7 pages.

* cited by examiner

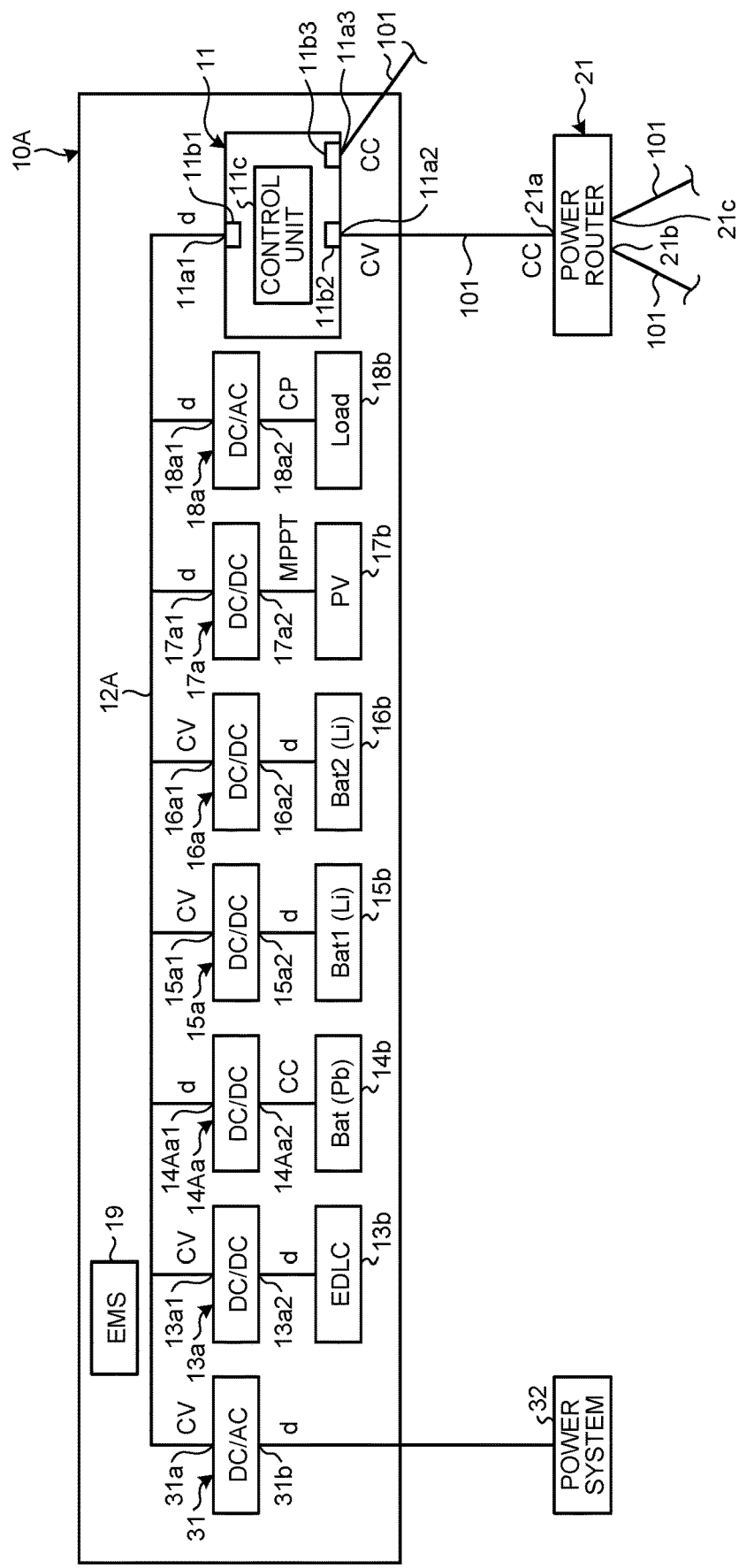

ELECTRIC POWER NETWORK AND METHOD OF CHANGING ELECTRIC POWER NETWORK

CROSS-REFERENCE TO RELATED APPLICATIONS

This application is a continuation of PCT international application Ser. No. PCT/JP2020/043964 filed on Nov. 26, 2020 which designates the United States, incorporated herein by reference, and which claims the benefit of priority from Japanese Patent Application No. 2019-218832, filed on Dec. 3, 2019, incorporated herein by reference.

BACKGROUND

1. Technical Field

The present disclosure relates to an electric power network and a method of changing electric power network.

2. Related Art

In recent years, power sources using renewable energy are increasingly introduced to address global warming issues. For example, target global average temperature is set in the 24-th United Nations Climate Change Conference (COP24), and introduction of renewable energy is a global trend. In contrast, due to a limitation on frequency stabilization, if an introduction ratio of renewable energy that largely varies and that does not have synchronization power (governor-free (GF), load frequency control (LFC), or the like) is increased in a current electric power system, a failure, such as large-scale power outage, may occur.

To cope with this, in recent years, technologies related to introduction of renewable energy have been proposed (Japanese Laid-open Patent Publication No. 2011-061970; International Publication WO2014/033892; Rikiya Abe, et al., "Digital Grid: Communicative Electrical Grids of the Future", IEEE Transactions on Smart Grid (Volume: 2, Issue: 2, June 2011)). For example, Japanese Laid-open Patent Publication No. 2011-061970 and Rikiya Abe, et al., "Digital Grid: Communicative Electrical Grids of the Future", IEEE Transactions on Smart Grid (Volume: 2, Issue: 2, June 2011) propose a system that is based on a plurality of locally produced and consumed microgrids and that connects the microgrids in an asynchronous manner to enable energy interchange, and also propose power router (what is called a digital grid router) as a corresponding device. With the technologies as described above, it may become possible to realize mass introduction of renewable energy.

SUMMARY

In some embodiments, an electric power network includes: a plurality of power routers each including a plurality of power ports, each power port being capable of inputting and outputting direct-current power, each power router being configured to convert electric power input from any of the power ports of the power router and to output the converted electric power from at least one of remaining power ports of the power router; a plurality of interconnection lines configured to connect the power routers in a grid manner via the power ports; and an electric power apparatus configured to consume or supply electric power, the electric power apparatus being connected to a power port that is included in at least one of the power routers and that is not connected to any of the interconnection lines. At least one of the power ports of each of the power routers is set as a dependent port for which characteristics of direct-current power to be input or output are not controlled.

In some embodiments, Provided is a method of changing an electric power network that includes a plurality of power routers each including a plurality of power ports, each power port being capable of inputting and outputting direct-current power, each power router being configured to convert electric power input from at least one of the power ports of the power router and to output the converted electric power from at least one of other power ports of the power router, a plurality of interconnection lines configured to connect the power routers in a grid manner via the power ports, and an electric power apparatus configured to consume or supply electric power, the electric power apparatus being connected to a power port and that is included in at least one of the power routers and that is not connected to any of the interconnection lines, at least one of the power ports of each of the power routers being set as a dependent port for which characteristics of direct-current power to be input or output are not controlled. The method includes: stopping operation of at least two of the power routers in relation to a power port to be connected with an interconnection line among the power ports of each of the at least two of the power routers; maintaining operation of the at least two of the power routers in relation to a power port other than the power port to be connected; and connecting the power port to be connected and an additional power router with the interconnection line.

In some embodiments, provided is a method of changing an electric power network that includes a plurality of power routers each including a plurality of power ports, each power port being capable of inputting and outputting direct-current power, each power router being configured to convert electric power input from at least one of the power ports of the power router and to output the converted electric power from at least one of other power ports of the power router, a plurality of interconnection lines configured to connect the power routers in a grid manner via the power ports, and an electric power apparatus configured to consume or supply electric power, the electric power apparatus being connected to a power port and that is included in at least one of the power routers and that is not connected to any of the interconnection lines, at least one of the power ports of each of the power routers being set as a dependent port for which characteristics of direct-current power to be input or output are not controlled. The method includes: switching, when a failure occurs in at least one interconnection line of the interconnection lines and the controller determines that a power port connected to the interconnection line in which the failure has occurred is the dependent port, at least one of remaining power ports of the power router including the dependent port to a dependent port.

In some embodiments, provided is a method of changing an electric power network that includes a plurality of power routers each including a plurality of power ports, each power port being capable of inputting and outputting direct-current power, each power router being configured to convert electric power input from at least one of the power ports of the power router and to output the converted electric power from at least one of other power ports of the power router, a plurality of interconnection lines configured to connect the power routers in a grid manner via the power ports, and an electric power apparatus configured to consume or supply electric power, the electric power apparatus being connected to a power port and that is included in at least one of the power routers and that is not connected to any of the interconnection lines, at least one of the power ports of each of the power routers being set as a dependent port for which characteristics of direct-current power to be input or output are not controlled, each of the power ports of the at least one of the power routers being connected to each of power storage apparatuses, each power storage apparatus being able to store and discharge direct-current power. The method includes: mutually switching the power ports that are connected to the respective power storage apparatuses between a dependent port and a control port in accordance with a charge state of each of the power storage apparatuses.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 1B is a diagram for explaining another mode of the components of the electric power network according to one embodiment;

DETAILED DESCRIPTION

Figure 1A:
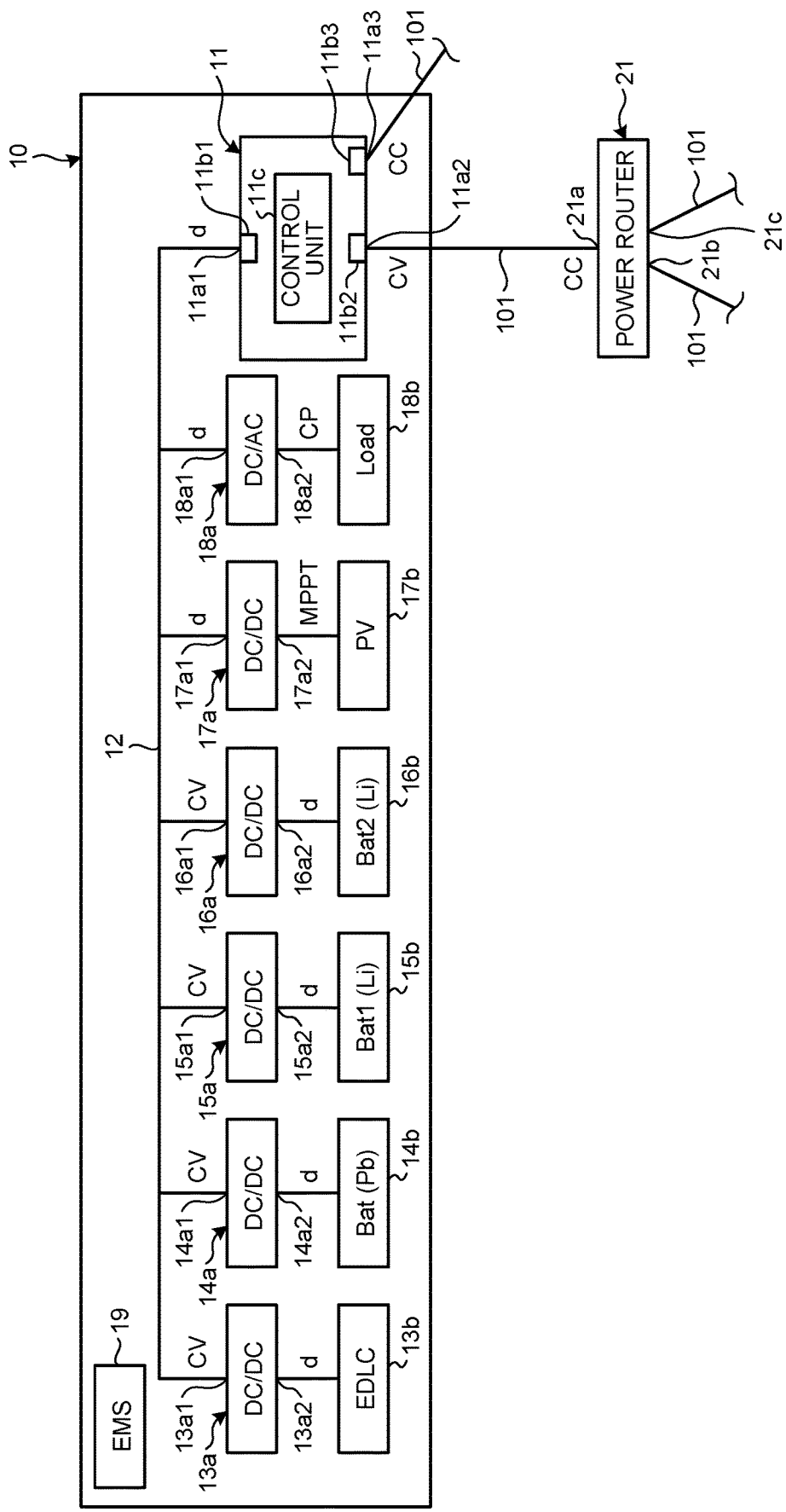
FIG. 1A is a diagram for explaining components of an electric power network according to one embodiment.

Embodiments will be described below with reference to the drawings. The disclosure is not limited by the embodiments below. Further, in description of the drawings, the same or corresponding components are appropriately denoted by the same reference symbols.

Components of Electric Power Network

First, components of an electric power network according to one embodiment will be described with reference to FIG. 1A. The electric power network includes, for example, a microgrid 10 and a power router 21. The microgrid includes a power router 11, a tree-shaped DC bus 12, DC/DC converters 13a, 14a, 15a, 16a and 17a, and a DC/AC converter 18a. The microgrid further includes, as electric power apparatuses, an electric double-layer capacitor (EDLC) 13b, batteries 14b, 15b and 16b, a photovoltaic (PV) apparatus 17b, a load 18b, and an energy management system (EMS) 19.

Configuration of Power Router

The power router 11 according to the present embodiment includes a plurality of, in particular, three, power ports 11a1, 11a2 and 11a3, three power measurement units 11b1, 11b2 and 11b3, and a control unit 11c that controls operation of the power router 11.

Each of the power ports 11a1, 11a2 and 11a3 is a power port that is able to input and output direct-current power. The power router 11 is one example of a power router that converts electric power input from any of the power ports 11a1, 11a2 and 11a3 and outputs the electric power from at least one of the remaining power ports. The power router 11 may be configured with, for example, a power converter of a self-excited type that bidirectionally converts electric power.

Each of the power measurement units 11b1, 11b2 and 11b3 is a measurement apparatus that measures a characteristic value related to electric power that is distributed through a corresponding one of the power ports 11a1, 11a2 and 11a3. Examples of the characteristic value measured by the power measurement units 11b1, 11b2 and 11b3 include voltage, an electric current, power flow, and a phase.

The control unit 11c is able to control the power converter and control a distribution amount of the electric power at the power ports 11a1 and 11a2. The control unit 11c includes, for example, an arithmetic unit, a storage unit, and a communication unit.

The arithmetic unit performs various kinds of arithmetic processing to implement functions of the control unit 11c, and is configured with a central processing unit (CPU), an application specific integrated circuit (ASIC), a field-programmable gate array (FPGA), a digital signal processor (DSP), a graphics processing unit (GPU), or an appropriate combination of the above-described units, for example.

The storage unit includes, for example, a read only memory (ROM) that stores therein various programs and data that are used by the arithmetic unit to perform arithmetic processing. Further, the storage unit includes, for example, a random access memory (RAM) that is used as a workspace by the arithmetic unit to perform arithmetic processing or that is used to store a result of arithmetic processing performed by the arithmetic unit. The storage unit may include an auxiliary storage device, such as a hard disk drive (HDD) or a solid state drive (SSD). At least a part of the functions of the control unit 11c is implemented as a functional unit by causing the arithmetic unit to read various programs from the storage unit and execute the various programs.

The communication unit is configured so as to be able to communicate with the power measurement units 11b1, 11b2 and 11b3, and receives information on the characteristic values that are measured by the power measurement units 11b1, 11b2 and 11b3. The received information is stored in the storage unit as described above. Further, the communication unit is configured so as to be able to communicate with the EMS 19, and is able to receive a control command from the EMS 19 and transmit information on an operating state of the power router 11 or information on the characteristic values stored in the storage unit to the EMS 19.

In the power router 11, the power port 11a1 is connected to the DC bus 12. The power port 11a2 is connected to power port 21a of the power router 21 via an interconnection line 101 that serves as a power path. Meanwhile the interconnection line may be referred to as an Edge. The power router 21 has the same configuration and the same functions as those of the power router 11. The power port 11$a$3 is connected to a certain power port of a certain power router (not illustrated) via the interconnection line 101. The power router 21 further includes power ports 21$b$ and 21$c$, in addition to the power port 21$a$. Each of the power ports 21$b$ and 21$c$ is connected to a different power port of a different power router via the interconnection line 101. In other words, the plurality of interconnection lines 101 connect the plurality of power routers 11, 21, and other power routers in a grid manner via the power ports. Further, the power port 11$a$1 is a power port that is not connected to the interconnection line.

In the power router 11, the power port 11$a$1 is set as a dependent port for which characteristics of direct-current power to be input or output are not controlled. The power port 11$a$2 is set as a constant voltage control port for which voltage of electric power to be input or output is controlled constant. The power port 11$a$3 is set as a constant current control port for which an electric current of electric power to be input or output is controlled constant. The constant voltage control port and the constant current control port are one examples of a control port for which characteristics of direct-current power to be input or output are controlled. Meanwhile, the voltage or the electric current may vary within an allowable range. The voltage or the electric current that varies within the allowable range can be regarded as constant. The allowable range is set by taking into account safety, operational stability, or the like of apparatuses, such as the power routers, included in the electric power network.

In the following, the dependent port may be referred to as a d (dependent) port, the constant voltage control port may be referred to as a CV (constant voltage) port, and the constant current control port may be referred to as a CC (constant current) port. In the drawings, setting of the power ports may be indicated by symbols "d", "CV", and "CC".

In contrast, in the power router 21, the power port 21$a$ is set as a CC port. The power port of the power route is set to any of the d port, the CV port, and the CC port.

Each of the power routers 11 and 21 includes the three power ports, but may include four or more power ports.

Components Connected to DC Bus 12

Components connected to the DC bus 12 will be described below. The components are connected to the power port 11$a$1 that is not connected to the interconnection line.

The EDLC 13$b$ is an electric double-layer capacitor, is one example of an electric power apparatus that supplies electric power, and is also one example of a power storage apparatus that is able to store and discharge direct-current power. The DC/DC converter 13$a$ includes an input-output port 13$a$1 that is electrically connected to the DC bus 12, and an input-output port 13$a$2 that is electrically connected to the EDLC 13$b$. The DC/DC converter 13$a$, when direct-current power that depends on a storage amount (charge amount) of the EDLC 13$b$ is input from the EDLC 13$b$ to the input-output port 13$a$2, converts the direct-current power into direct-current power at constant voltage in a predetermined range and outputs the converted direct-current power from the input-output port 13$a$1 to the DC bus 12. In contrast, when direct-current power at constant voltage in a predetermined range is input from the DC bus 12 to the input-output port 13$a$1, the DC/DC converter 13$a$ converts the direct-current power into dependent direct-current power and outputs the converted direct-current power from the input-output port 13$a$2 to the EDLC 13$b$. In other words, the input-output port 13$a$1 is set as the CV port and the input-output port 13$a$2 is set as the d port.

The battery 14$b$ is a lead-acid battery, is one example of an electric power apparatus that supplies electric power, and is also one example of a power storage apparatus that is able to store and discharge direct-current power. The DC/DC converter 14$a$ includes an input-output port 14$a$1 that is electrically connected to the DC bus 12, and an input-output port 14$a$2 that is electrically connected to the battery 14$b$. The DC/DC converter 14$a$, when direct-current power that depends on a storage amount (charge amount) of the battery 14$b$ is input from the battery 14$b$ to the input-output port 14$a$2, converts the direct-current power into direct-current power at constant voltage in a predetermined range and outputs the converted direct-current power from the input-output port 14$a$1 to the DC bus 12. In contrast, when direct-current power at constant voltage in a predetermined range is input from the DC bus 12 to the input-output port 14$a$1, the DC/DC converter 14$a$ converts the direct-current power into dependent direct-current power and outputs the converted direct-current power from the input-output port 14$a$2 to the battery 14$b$. In other words, the input-output port 14$a$1 is set as the CV port and the input-output port 14$a$2 is set as the d port.

The battery 15$b$ is a lithium ion battery, is one example of an electric power apparatus that supplies electric power, and is also one example of a power storage apparatus that is able to store and discharge direct-current power. The DC/DC converter 15$a$ includes an input-output port 15$a$1 that is electrically connected to the DC bus 12, and an input-output port 15$a$2 that is electrically connected to the battery 15$b$. The DC/DC converter 15$a$ is a DC/DC converter in which the input-output port 15$a$1 is set as the CV port and the input-output port 15$a$2 is set as the d port.

The battery 16$b$ is a lithium ion battery, is one example of an electric power apparatus that supplies electric power, and is also one example of a power storage apparatus that is able to store and discharge direct-current power. The DC/DC converter 16$a$ includes an input-output port 16$a$1 that is electrically connected to the DC bus 12, and an input-output port 16$a$2 that is electrically connected to the battery 16$b$. The DC/DC converter 16$a$ is a DC/DC converter in which the input-output port 16$a$1 is set as the CV port and the input-output port 16$a$2 is set as the d port.

Meanwhile, the batteries 14$b$, 15$b$, and 16$b$ may be mounted on an electric vehicle or a hybrid vehicle.

Further, the EDLC 13$b$ and the batteries 14$b$, 15$b$, and 16$b$ may include a well-known battery management system (BMS) that acquires information on a charge state, such as voltage or temperature. The BMS includes, for example, a sensor, a microcomputer, and an input-output interface. The BMS transmits the acquired information on the charge state to the DC/DC converter or an EMS (to be described later) that is connected to the BMS. The BMS may be arranged outside the EDLC 13$b$ and the batteries 14$b$, 15$b$, and 16$b$, or may be included in the DC/DC converter that is connected to the BMS.

The PV apparatus 17$b$ is one example of an electric power apparatus that supplies (generates) electric power with solar power. A power generation capacity of the PV apparatus 17$b$ varies in accordance with weather conditions, so that an optimal operating point at which the output power is maximized is changed. The DC/DC converter 17$a$ includes an input-output port 17$a$1 that is electrically connected to the DC bus 12, and an input-output port 17$a$2 that is electrically connected to the PV apparatus 17$b$. The DC/DC converter 17$a$ is controlled based on a maximum power point tracking (MPPT) system in which when direct-current power that depends on a power generation capacity of the PV apparatus 17b is input from the PV apparatus 17b to the input-output port 17a2, the operating point follows such that the output power is maximized at the power generation capacity. The DC/DC converter 17a outputs dependent direct-current power that corresponds to maximum output power from the input-output port 17a1 to the DC bus 12. In other words, the input-output port 17a1 is set as the d port.

The load 18b is one example of an electric power apparatus that consumes alternating-current power. The DC/AC converter 18a includes an input-output port 18a1 that is electrically connected to the DC bus 12, and an input-output port 18a2 that is electrically connected to the load 18b. The DC/AC converter 18a, when direct-current power at constant voltage in a predetermined range is input from the DC bus 12 to the input-output port 18a1, converts the direct-current power into alternating-current power at constant electric power in a predetermined range and outputs the alternating-current power from the input-output port 18a2 to the load 18b. The load 18b operates with the alternating-current power. In other words, the input-output port 18a2 is set as the d port and the input-output port 18a2 is set as a constant power control port.

The EMS 19 is a system that integrally manages a state of the microgrid 10. The EMS 19 controls the DC/DC converters 13a, 14a, 15a, 16a, 17a and the DC/AC converter 18a, and controls electric power for which an electric current, voltage, or electric power is to be controlled among electric power input and output to and from the DC/DC converters 13a, 14a, 15a, 16a, 17a and the DC/AC converter 18a. Meanwhile, the DC/DC converters 13a, 14a, 15a, 16a, 17a and the DC/AC converter 18a that are power converters include power measurement units that measure characteristic values related to the electric power to perform control and that are the same as the power measurement unit 11b1, and are configured so as to be able to transmit information on measurement results of the characteristic values to the EMS 19. The EMS 19 controls operation of each of the power converters on the basis of the received information on the measurement results. Further, the EMS 19 receives, from the control unit 11c of the power router 11, information on the operating state of the power router 11 and information on the characteristic values stored in the storage unit, and transmits a control command to the control unit 11c on the basis of the received information. In other words, the EMS 19 is able to control operation of the power router 11. Furthermore, the EMS 19 may be configured so as to be able to communicate with an EMS of a different microgrid. In this case, the EMS 19 is able to control operation of at least two power routers, such as the power router 11 and a power router of the different microgrid.

The EMS 19 includes, for example, an arithmetic unit, a storage unit, and a communication unit, similarly to the control unit 11c. The arithmetic unit includes a CPU, an ASIC, a FPGA, a DSP, a GPU, an appropriate combination of the above-described units, or the like for performing various kinds of arithmetic processing to implement functions of the EMS 19. The storage unit includes a ROM that stores therein various programs and data that are used by the arithmetic unit to perform arithmetic processing, a RAM that is used as a workspace by the arithmetic unit to perform arithmetic processing or that is used to store a result of arithmetic processing performed by the arithmetic unit, or the like, and may further include an auxiliary storage device, such as a HDD or a SSD. At least a part of the functions of the control unit is implemented as a functional unit by causing the arithmetic unit to read various programs from the storage unit and execute the various programs.

FIG. 1B is a diagram for explaining another mode of the components of the electric power network according to one embodiment. In FIG. 1B, the microgrid 10 illustrated in FIG. 1 is replaced with a microgrid 10A.

The microgrid 10A is configured by, in the configuration of the microgrid 10, replacing the DC bus 12 with a DC bus 12A, replacing the DC/DC converter 14a with a DC/DC converter 14Aa, and adding a DC/AC converter 31.

In the DC/AC converter 31, an input-output port 31a on a DC side is electrically connected to the DC bus 12 and an input-output port 31b on an AC side is electrically connected to a power system 32 of an electric power company. The DC/AC converter 31, when dependent alternating-current power is input from the power system 32 to the input-output port 31b, converts the alternating-current power into direct-current power at constant voltage in a predetermined range and outputs the converted direct-current power from the input-output port 31a to the DC bus 12A. Further, when direct-current power at constant voltage in a predetermined range is input from the DC bus 12A to the input-output port 31a, the DC/AC converter 31 converts the direct-current power into dependent alternating-current power and outputs the converted alternating-current power from the input-output port 31b to the power system 32. In other words, the input-output port 31a is set as a CV terminal port and the input-output port 31b is set as the d port. With this configuration, the microgrid 10A is able to receive electric power from the power system 32 and output electric power (for example, sell electric power) to the power system 32.

Further, in the microgrid 10A, the DC/DC converter 14Aa includes an input-output port 14Aa1 that is electrically connected to the DC bus 12A, and an input-output port 14Aa2 that is electrically connected to the battery 14b. The DC/DC converter 14Aa, when direct-current power at a constant current in a predetermined range is input from the battery 14b to the input-output port 14Aa2, converts the direct-current power into dependent direct-current power and outputs the converted direct-current power from the input-output port 14a1 to the DC bus 12A. In contrast, when dependent direct-current power is input from the DC bus 12A to the input-output port 14Aa1, the DC/DC converter 14Aa converts the direct-current power into direct-current power at a constant current in a predetermined range and outputs the converted direct-current power from the input-output port 14Aa2 to the battery 14b. In other words, the input-output port 14Aa1 is set as the d port and the input-output port 14Aa2 is set as the CC port.

Each of embodiments will be described below on the basis of the description of the components as described above.

First Embodiment

Figure 2:
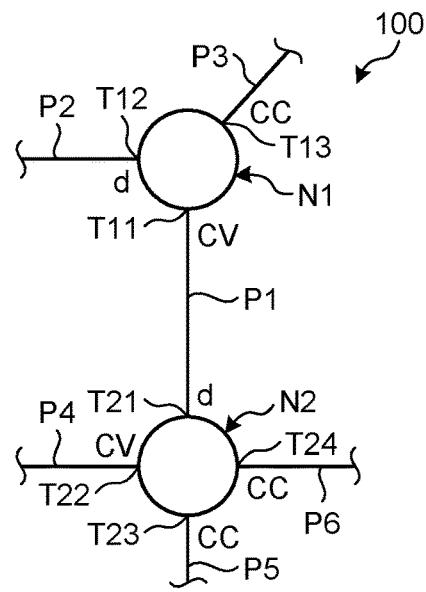
FIG. 2 is a configuration diagram of an electric power network according to a first embodiment.

FIG. 2 is a configuration diagram of an electric power network according to a first embodiment. An electric power network 100 includes a plurality of nodes each including a plurality of power ports, and a plurality of interconnection lines that connect the nodes in a grid manner via the power ports. In FIG. 2, a node N1 and a node N2 are illustrated among the plurality of nodes and power paths P1, P2, P3, P4, P5 and P6 are illustrated among the plurality of interconnection lines.

Each of the nodes N1 and N2 is configured with a microgrid like the microgrids 10 and 10A as illustrated in FIG. 1A and FIG. 1B, and includes a power router, a DC bus, and various electric power apparatuses. However, the plurality of nodes of the electric power network 100 may include a node that includes only a power router. In other words, each of the nodes includes a power router.

Power ports T11, T12, and T13 that are included in the power router of the node N1 are set as the CV port, the d port, and the CC port, respectively. Power ports T21, T22, T23, and T24 that are included in the power router of the node N2 are set as the d port, the CV port, the CC port, and the CC port, respectively. Meanwhile, types of the power ports of the nodes may be interchanged under the control of a control unit included in the power router.

The power path P1 connects the power port T11 that is the CV port of the node N1 and the power port T21 of the node N2. The power path P2 connects the power port T12 of the node N1 and a power port of a different node. The power path P3 connects the power port T13 of the node N1 and a power port of a different node. The power path P4 connects the power port T22 of the node N2 and a power port of a different node. The power path P5 connects the power port T23 of the node N2 and a power port of a different node. The power path P6 connects the power port T24 of the node N2 and a power port of a different node.

In each of the nodes, at least one of the power ports is set as the d port. Further, one end of each of the interconnection lines is connected to the CV port. The other end of each of the interconnection lines is connected to the d port or the CC port.

In this manner, in the electric power network 100, at least one of the power ports of each of the nodes is set as the d port, so that it is possible to adjust a difference between an inflow amount and an outflow amount of electric power in each of the nodes by the d port. In this case, the d port functions as a buffer. For example, in the node N1, if electric power flows out of the power ports T11 and T13, the same amount of electric power as a total sum of outflow amounts flows into the d port. Further, if a first amount of electric power flows out of the power port T11 and a second amount of electric power that is larger than the first amount flows into the power port T13, the same amount of electric power as a difference between the second amount and the first amount flows out of the d port. As a result, the electric power network 100 has a network configuration that is appropriate for flexible power interchange using the d port. Furthermore, one end of each of the interconnection lines is connected to the CV port. Therefore, voltage of electric power that is input to and output from the interconnection lines is stabilized. Moreover, if the other ends of the interconnection lines are connected to the CC port, voltage and flow are simultaneously controlled for the interconnection lines, so that it is possible to implement the interconnection lines that are more preferably controlled.

Second Embodiment

Figure 3:
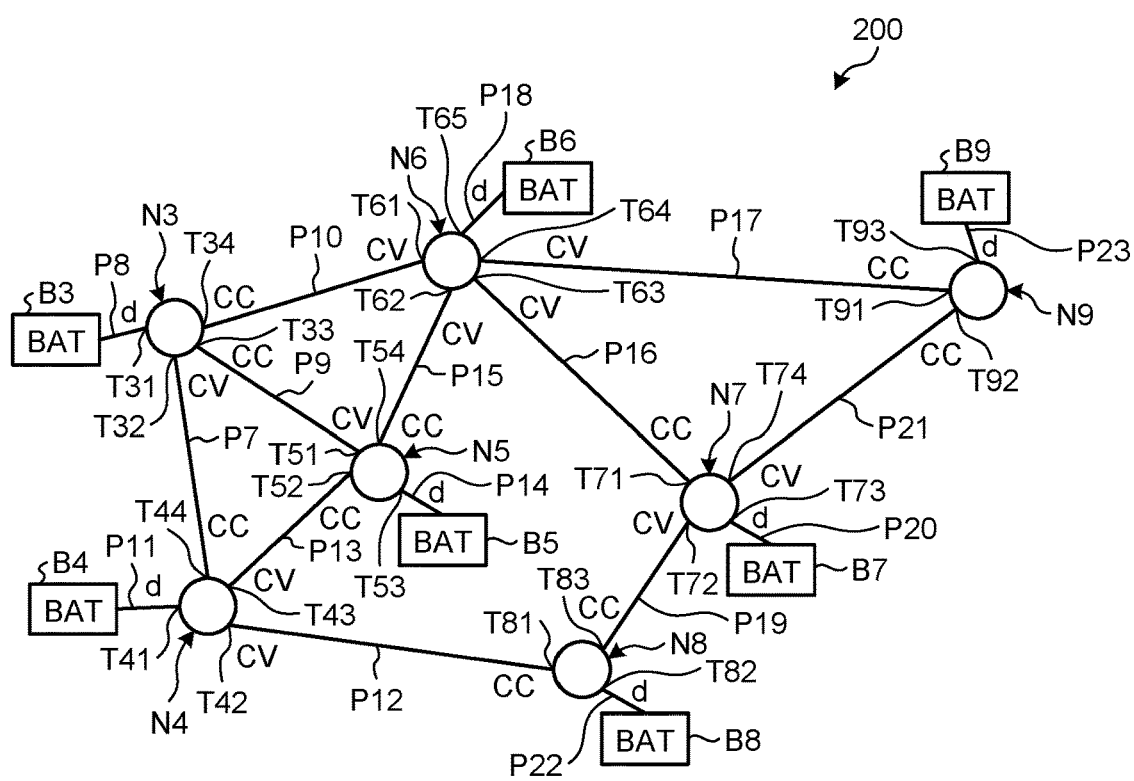
FIG. 3 is a configuration diagram of an electric power network according to a first embodiment according to a second embodiment.

FIG. 3 is a configuration diagram of an electric power network according to a second embodiment. An electric power network 200 includes a plurality of nodes N3, N4, N5, N6, N7, N8 and N9, power paths P7, P8, P9, P10, P11, P12, P13, P14, P15, P16, P17, P18, P19, P20, P21, P22 and P23, and batteries B3, B4, B5, B6, B7, B8 and B9.

The node N3 includes power ports T31, T32, T33 and T34 that are set as the d port, the CV port, the CC port, and the CC port, respectively. The node N4 includes power ports T41, T42, T43 and T44 that are set as the d port, the CV port, the CV port, and the CC port, respectively. The node N5 includes the power ports T51, T52, T53 and T54 that are set as the CV port, the CC port, the d port, and the CC port, respectively.

The node N6 includes the power ports T61, T62, T63, T64 and T65 that are set as the CV port, the CV port, the CV port, the CV port, and the d port, respectively. The node N7 includes the power ports T71, T72, T73 and T74 that are set as the CC port, the CV port, the d port, and the CV port, respectively. The node N8 includes the power ports T81, T82 and T83 that are set as the CC port, the d port, and the CC port, respectively. The node N9 includes power ports T91, T92 and T93 that are set as the CC port, the CC port, and the d port, respectively.

The batteries B3, B4, B5, B6, B7, and B8 are one examples of a power storage apparatus that is able to store and discharge direct-current power.

The power path P7 is an interconnection line that connects the power port T32 that is the CV port of the node N3 and the power port T44 that is the CC port of the node N4. Therefore, the power path P7 is an interconnection line for which voltage and flow are controlled. The interconnection line as described above may be referred to as a controlled interconnection line. The power path P8 connects the battery B3 and the power port T31 that is the d port of the node N3. The power path P9 is a controlled interconnection line which connects the power port T33 that is the CC port of the node N3 and the power port T51 that is the CV port of the node N5 and for which voltage and flow are controlled. The power path P10 is a controlled interconnection line which connects the power port T34 that is the CC port of the node N3 and the power port T61 that is the CV port of the node N6 and for which voltage and flow are controlled.

The power path P11 connects the battery B4 and the power port T41 that is the d port of the node N4. The power path P12 is a controlled interconnection line which connects the power port T42 that is the CV port of the node N4 and the power port T81 that is the CC port of the node N8 and for which voltage and flow are controlled. The power path P13 is a controlled interconnection line which connects the power port T43 that is the CV port of the node N4 and the power port T52 that is the CC port of the node N5 and for which voltage and flow are controlled.

The power path P14 connects the battery B5 and the power port T53 that is the d port of the node N5. The power path P15 is a controlled interconnection line which connects the power port T54 that is the CC port of the node N5 and the power port T62 that is the CV port of the node N6 and for which voltage and flow are controlled. The power path P16 is a controlled interconnection line which connects the power port T63 that is the CV port of the node N6 and the power port T71 that is the CC port of the node N7 and for which voltage and flow are controlled. The power path P17 is a controlled interconnection line which connects the power port T64 that is the CV port of the node N6 and the power port T91 that is the CC port of the node N9 and for which voltage and flow are controlled.

The power path P18 connects the battery B6 and the power port T65 that is the d port of the node N6. The power path P19 is a controlled interconnection line which connects the power port T72 that is the CV port of the node N7 and the power port T83 that is the CC port of the node N8 and for which voltage and flow are controlled.

The power path P20 connects the battery B7 and the power port T73 that is the d port of the node N7. The power path P21 is a controlled interconnection line which connects the power port T74 that is the CV port of the node N7 and the power port T92 that is the CC port of the node N9 and the voltage and for which voltage and flow are controlled. The power path P22 connects the battery B8 and the power port T82 that is the d port of the node N8. The power path P23 connects the battery B9 and the power port T93 that is the d port of the node N9.

In the electric power network 200, voltage and current are controlled for all of the power paths P7, P9, P10, P12, P13, P15, P16, P17, P19 and P21 that are the interconnection lines. Further, in each of the nodes N3, N4, N5, N6, N7, N8 and N9, each of the batteries B3, B4, B5, B6, B7, B8 and B9 is connected to the d port, so that it is possible to adjust a difference between an inflow amount and an outflow amount of electric power in each of the nodes, and a flexible network configuration is implemented in which arbitrary power interchange through all of the interconnection lines is enabled.

Third Embodiment

Figure 4:
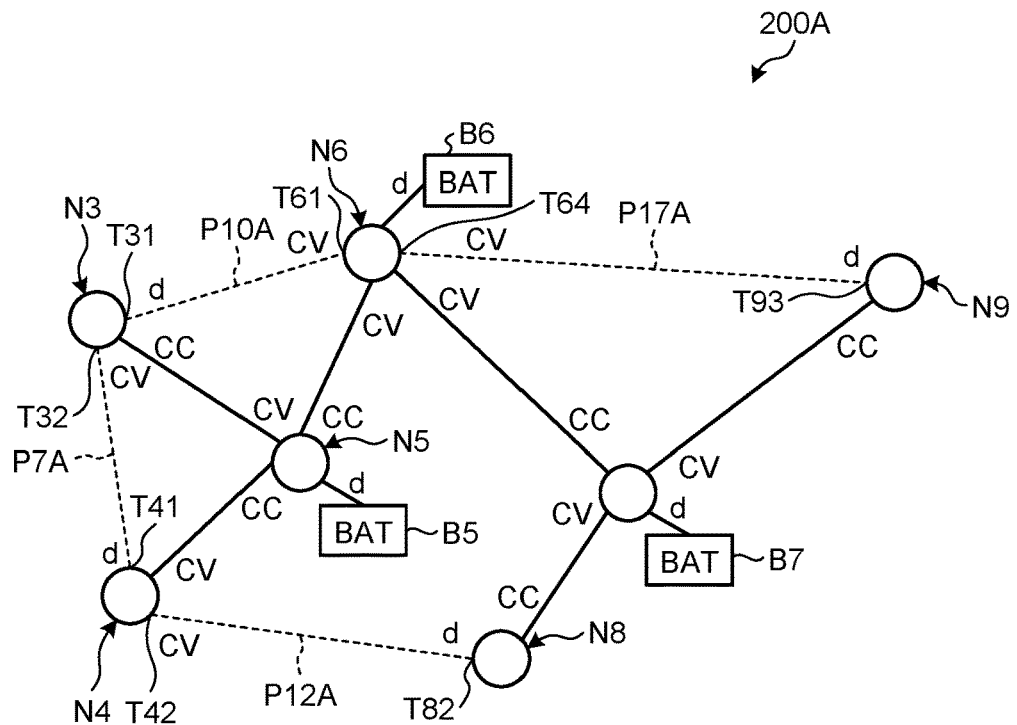
FIG. 4 is a configuration diagram of an electric power network according to a first embodiment according to a third embodiment.

FIG. 4 is a configuration diagram of an electric power network according to a third embodiment. An electric power network 200A is configured by, in the configuration of the electric power network 200 illustrated in FIG. 3, removing the batteries B3, B4, B8, and B9 and replacing the power paths P7, P10, P12, and P17 with power paths P7A, P10A, P12A, and P17A, respectively. Further, in the nodes N3, N4, N8, and N9, connection destinations of some of the power ports are changed.

Specifically, in the node N3, the power port T31 that is set as the d port is connected to the power path P10A. As a result, one end of the power path P10A is connected to the d port and the other end is connected to the power port T61 that is the CV port of the node N6, and therefore, the power path P10A is not an interconnection line for which both of voltage and flow are controlled. The interconnection line as described above may be referred to as a non-controlled interconnection line. Meanwhile, in the drawing, non-controlled interconnection lines are indicated by dashed lines.

Further, in the node N4, the power port T41 that is set as the d port 1 is connected to the power path P7A. As a result, the power path P7A is a non-controlled interconnection line for which one end is connected to the d port and the other end is connected to the power port T32 that is the CV port of the node N3.

Furthermore, in the node N8, the power port T82 that is set that is the d port is connected to the power path P12A. Therefore, the power path P12A is a non-controlled interconnection line for which one end is connected to the d port and the other end is connected to the power port T42 that is the CV port of the node N4.

Moreover, in the node N9, the power port T93 that is set as the d port is connected to the power path P17A. Therefore, the power path P17A is a non-controlled interconnection line for which one end is connected to the d port and the other end is connected to the power port T64 that is the CV port of the node N6.

In the electric power network 200A, the d ports of the nodes N5, N6, and N7, each of which has the CV port connected to the d port via the interconnection line, are connected to the batteries B5, B6, and B7, respectively. In the electric power network 200A, although not all of the interconnection lines are configured as the controlled interconnection lines, a network configuration that is able to perform flexible power interchange while reducing the number of batteries is implemented by connecting the d port of the node for which the battery is removed (for example, the d port of the node N9) and the CV port of the node for which the battery is not removed (for example, the CV port of the node N6).

Fourth Embodiment

Figure 5:
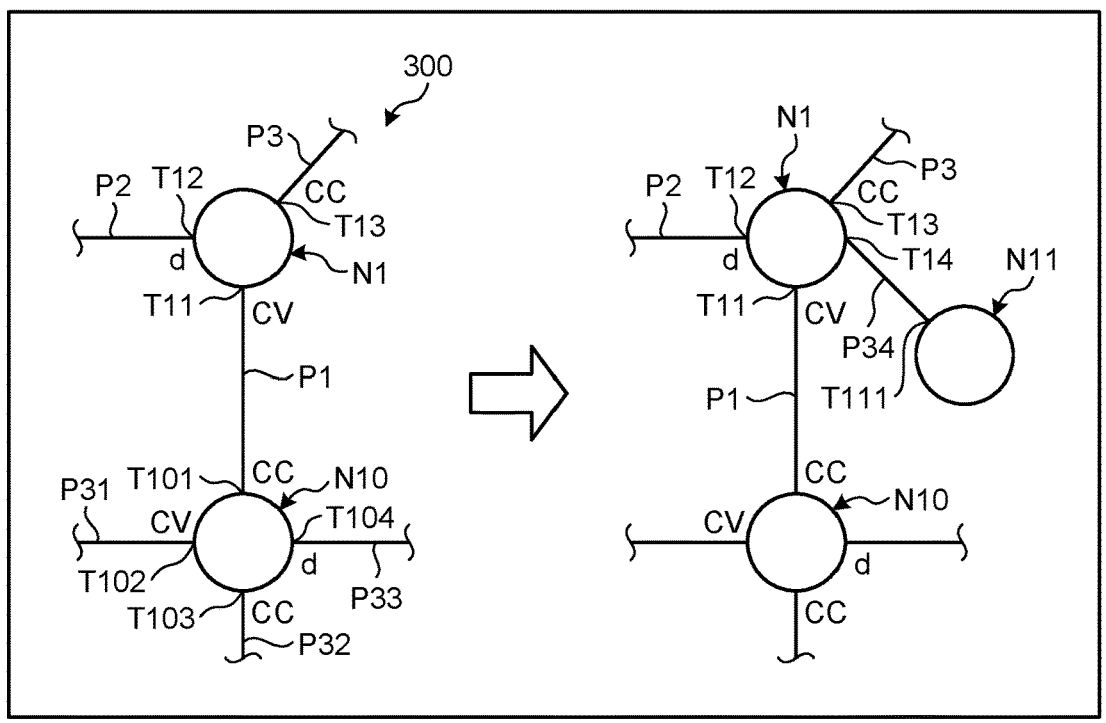
FIG. 5 is a diagram for explaining a method of expanding an electric power network according to a fourth embodiment.

A method of expanding an electric power network will be described below as one example of a method of changing the electric power network. FIG. 5 is a diagram for explaining a method of expanding an electric power network according to the fourth embodiment. An electric power network 300 illustrated in FIG. 5 is configured by, in the configuration of the electric power network 100 illustrated in FIG. 2, replacing the node N2 with a node N10. The node N10 includes power ports T101, T102, T103, and T104. The power port T101 is the CC port and connected to the power port T11 that is the CV port of the node N1 via the power path P1. The power port T102 is the CV port and connected to a different node via a power path P31. The power port T103 is the CC port and connected to a different node via a power path P32. The power port T104 is the d port and connected to a different node via a power path P33.

To expand the electric power network 300, it is sufficient to connect a power port T111 of a node N11 to a power port T14 that is a free port of the node N1 via a power path P14. At this time, if one of the power port T14 and the power port T111 is set to the CV port and the other one is set to the CC port, the power path P14 is configured as a controlled interconnection line. Further, it is possible to perform expansion construction without interrupting operation of the other power ports T11, T12, and T13 of the node N1.

Fifth Embodiment

Figure 6:
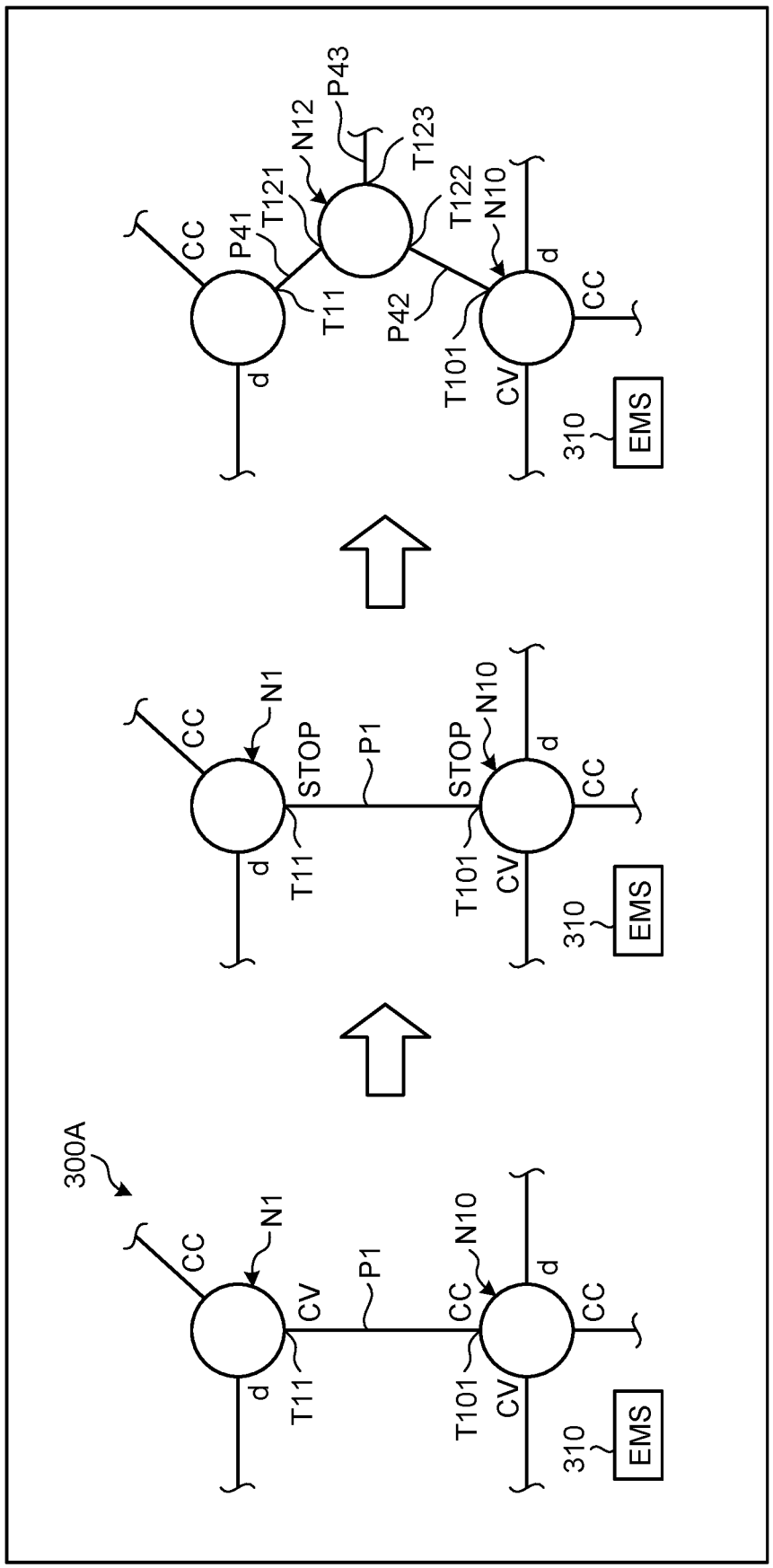
FIG. 6 is a diagram for explaining a method of expanding an electric power network according to a fifth embodiment.

FIG. 6 is a diagram for explaining a method of expanding an electric power network according to a fifth embodiment. An electric power network 300A illustrated in FIG. 6 is configured by, in the electric power network 300 illustrated in FIG. 5, adding an EMS 310 that is able to control operation of all of the nodes. The EMS 310 as described above may be referred to as a center EMS.

In the electric power network 300A, it is assumed that a new node is to be added between the node N1 and the node N10. In this case, the EMS 310 first stops operation of the node N1 and the node N10 in relation to the power ports T11 and T101 that are power ports to be connected via interconnection lines among the power ports of the node N1 and the node N10, and maintains operation of the node N1 and the node N10 in relation to the power ports other than the power ports to be connected.

Subsequently, the power path P1 is removed, a power port T121 of an additional node N12 and the power port T11 are connected via a power path P41 that serves as an interconnection line, and a power port T122 and the power port T101 are connected via a power path P42 that serves as an interconnection line. Another power port T123 of the node N12 may be connected to a different node via a power path P43. Meanwhile, the power ports connected to each of the power paths P41, P42, and P43 are set such that one of the power ports is the CV port and the other one is the CC port or the d port. Thereafter, the EMS 310 resumes the stopped operation of the nodes N1 and N10 and starts operation of the node N12.

With this method, in the node N1 and the node N10, only operation related to the power ports to be connected is stopped and operation related to the other ports is maintained, so that it is possible to perform expansion construction while controlling a degree of interruption of operation of the electric power network 300A.

Sixth Embodiment

Figure 7:
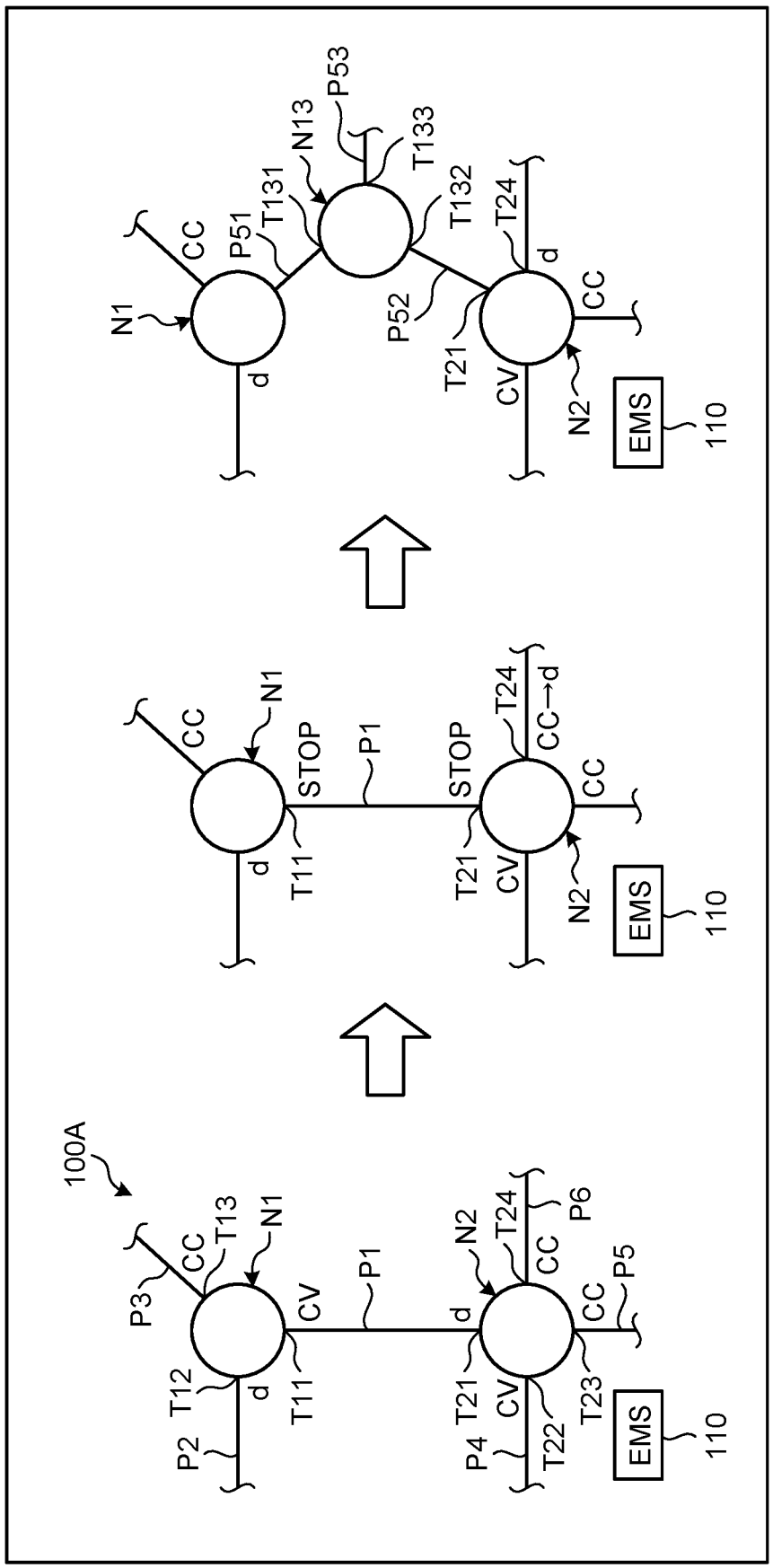
FIG. 7 is a diagram for explaining a method of expanding an electric power network according to a sixth embodiment.

FIG. 7 is a diagram for explaining a method of expanding an electric power network according to a sixth embodiment. An electric power network 100A illustrated in FIG. 7 is configured by, in the electric power network 100 illustrated in FIG. 2, adding an EMS 110 that is able to control operation of all of the nodes.

In the electric power network 100A, it is assumed that a new node is to be added between the node N1 and the node N2. In this case, the EMS 110 first stops operation of the node N1 and the node N2 in relation to the power ports T11 and T21 that are power ports to be connected via interconnection lines among the power ports of the node N1 and the node N2, and maintains operation of the node N1 and the node N2 in relation to the power ports other than the power ports to be connected. However, the power port T21 is set as the d port, and if operation of the power port T21 is stopped, the d port of the node N2 becomes absent. Therefore, before stopping operation of the node N2 in relation to the power port T21, the EMS 110 checks presence of a power port that is a power port other than the port to be connected and that is set as the CC port in the node N2. In this example, the power ports T23 and T24 are the CC ports, so that setting for changing, for example, the power port T24 to the d port is made.

Subsequently, the power path P1 is removed, a power port T131 of an additional node N13 and the power port T11 are connected via a power path P51 that serves as an interconnection line, and a power port T132 and the power port T21 are connected via a power path P52 that serves as an interconnection line. Another power port T133 of the node N13 may be connected to a different node via a power path P53. Thereafter, the EMS 110 resumes the stopped operation of the nodes N1 and N2 and starts operation of the node N13.

With this method, in the node N1 and the node N2, only operation related to the power ports to be connected is stopped and operation related to the other ports is maintained, so that it is possible to perform expansion construction while controlling a degree of interruption of operation of the electric power network 100A. Further, the d port is ensured in the node N2, so that it is possible to maintain flexible power interchange in the electric power network 100A.

Meanwhile, in this method, the power port that is set as the CC port is changed to the d port. In contrast, if all of power ports other than the port to be connected are the CV ports, the EMS appropriately selects any of the CV ports, changes a power port of a node that is connected to the selected CV port via an interconnection line to the CV port, and changes the selected CV port to the d port. With this configuration, it is possible to ensure a state in which one end of the interconnection line is connected to the CV port.

Seventh Embodiment

Figure 8:
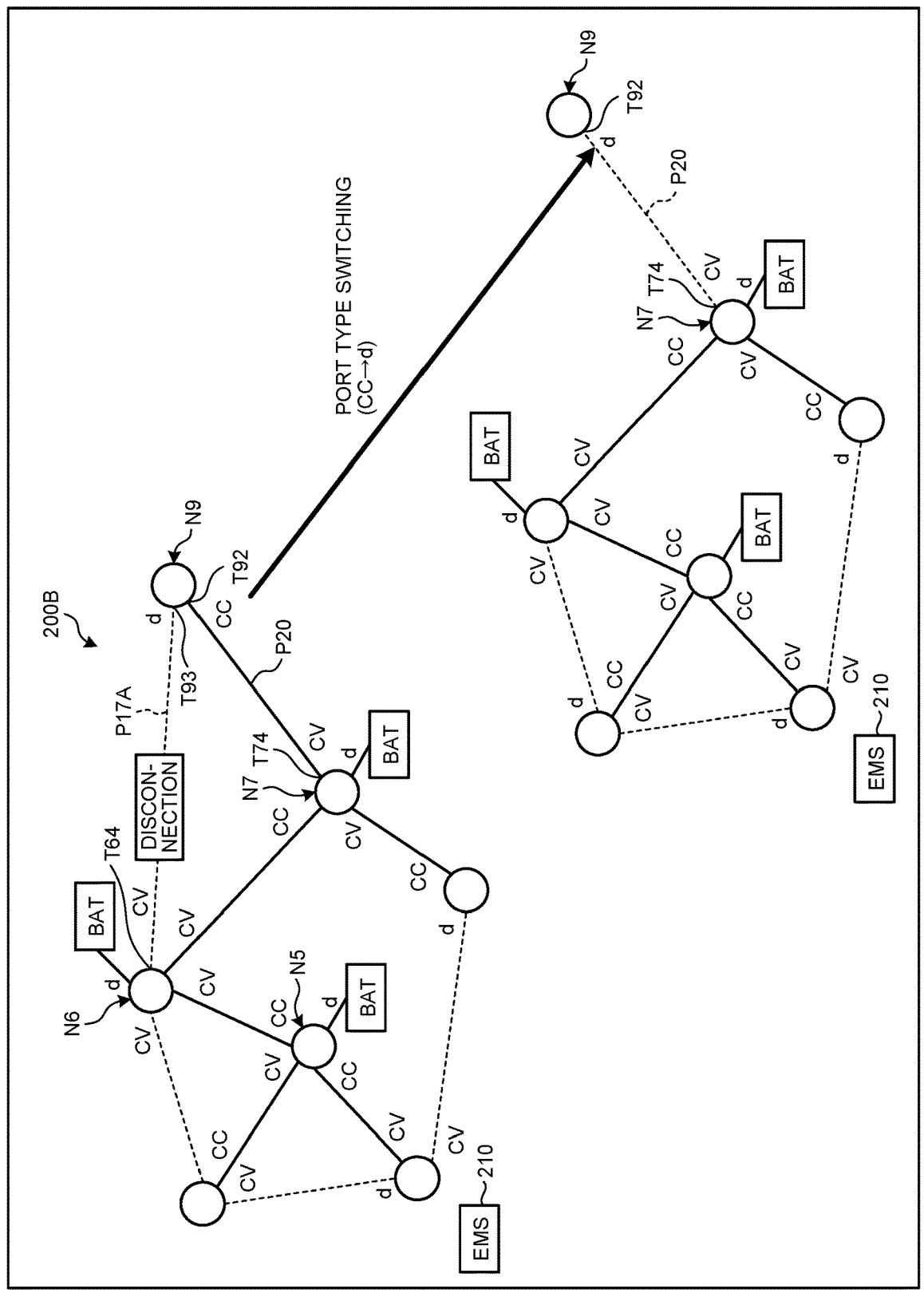
FIG. 8 is a diagram for explaining a method of operating an electric power network at the time of occurrence of a failure according to a seventh embodiment.

A method of operating an electric power network at the time of occurrence of a failure will be described as one example of the method of changing the electric power network. FIG. 8 is a diagram for explaining a method of operating an electric power network at the time of occurrence of a failure according to a seventh embodiment. An electric power network 200B illustrated in FIG. 8 is configured by, in the electric power network 200A illustrated in FIG. 4, adding an EMS 210 that is able to control operation of all of the nodes.

As illustrated in FIG. 8, it is assumed that disconnection occur in a power path P17A that is an interconnection line for connecting the power port T64 that is the CV port of the node N6 and the power port T93 that is the d port of the node N9. If disconnection occurs, the EMS 210 detects occurrence of the disconnection from information on a measurement result that is transmitted from a control unit of a power router included in each of the nodes N6 and N9. Further, if disconnection occurs, the control unit of the power router included in each of the nodes N6 and N9 may transmit information on the occurrence of the disconnection to the EMS 210.

If the EMS 210 detects the occurrence of the disconnection, the EMS 210 stops operation of the node N6 in relation to the power port T64 connected to the power path P17A and operation of the node N9 in relation to the power port T93. Before stopping the operation of the node N9 in relation to the power port T93, the EMS 210 determines that the power port T93 is the d port, transmits a control command to the node N9, and performs port type switching to switch the power port T92 that is set as the CC port to the d port. Accordingly, the d port is ensured in the node N9. Meanwhile, if the power port T92 is switched to the d port, a power path P20 that connects the power port T92 and the power port T74 of the node N7 is changed from a controlled interconnection line to a non-controlled interconnection line.

With this method, it is possible to control a degree of interruption of operation while maintaining flexible power interchange in the electric power network 200B.

Eighth Embodiment

Figure 9:
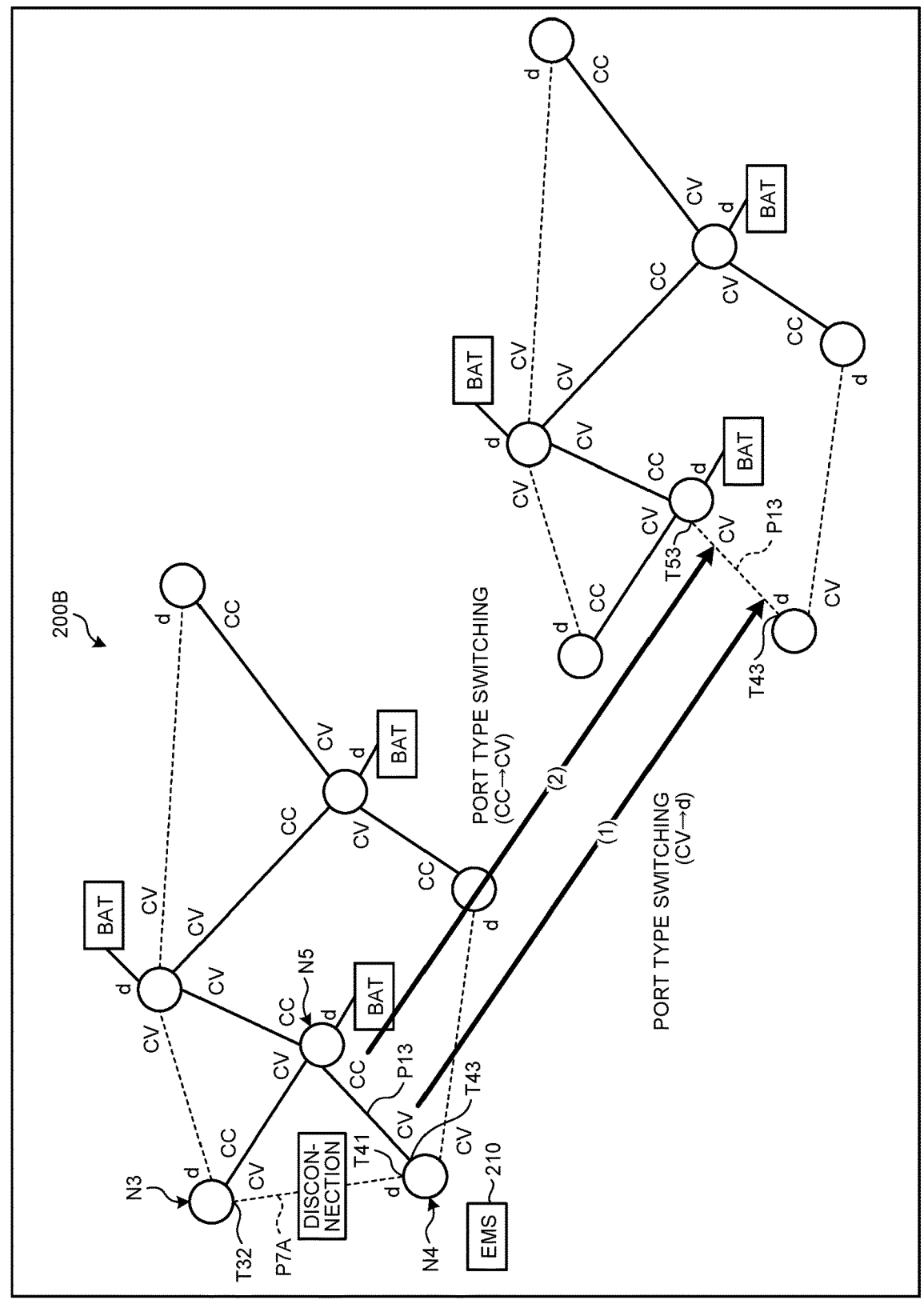
FIG. 9 is a diagram for explaining a method of operating an electric power network at the time of occurrence of a failure according to an eighth embodiment.

FIG. 9 is a diagram for explaining a method of operating an electric power network at the time of occurrence of a failure according to an eighth embodiment. The present embodiment will be described with reference to the electric power network 200B similarly to the seventh embodiment.

As illustrated in FIG. 9, it is assumed that disconnection occur in a power path P7A that is an interconnection line for connecting the power port T32 that is the CV port of the node N3 and the power port T41 that is the d port of the node N4. If disconnection occurs, the EMS 210 detects occurrence of the disconnection from information on a measurement result that is transmitted from a control unit of a power router included in each of the nodes N3 and N4. Further, if disconnection occurs, the control unit of the power router included in each of the nodes N3 and N4 may transmit information on the occurrence of the disconnection to the EMS 210.

If the EMS 210 detects the occurrence of the disconnection, the EMS 210 stops operation of the node N3 in relation to the power port T32 connected to the power path P7A and operation of the node N4 in relation to the power port T41. Before stopping the operation of the node N4 related to the power port T41, the EMS 210 determines that the power port T41 is the d port. Further, the EMS 210 confirms that the power ports other than the power port T41 in the node N4 are the CV ports. Thereafter, a control command is transmitted to the node N4, and a control command for performing port type switching of switching, for example, the power port T43 among the power ports that are set as the CV ports to the d port (port type switching (1)) is transmitted to the control unit of the power router of the node N4. Accordingly, the d port is ensured in the node N4. After completion of switching, the control unit of the power router of the node N4 notifies the EMS 210 of the completion.

In contrast, before switching the power port T43 to the d port, the EMS 210 checks a type of a power port that is connected to the power path P13 connected to the power port T43. In this example, the power port T52 of the node N5 serves as a connection destination of the power path P13 and is set to the CC port. In this case, the EMS 210 determines that the power port T52 is not the CV port, and transmits a control command to a control unit of a power router of the node N5 to perform port type switching of switching the power port T52 to the CV port (port type switching (2)). After completion of switching, the control unit of the power router of the node N5 notifies the EMS 210 of the completion. After receiving a notice of the completion, the EMS 210 switches the power port T43 to the d port. Accordingly, the power path P13 is changed to a non-controlled interconnection line, but voltage is controlled constant because one end of the power path P13 is connected to the CV port.

With this method, it is possible to control a degree of interruption of operation while maintaining flexible power interchange in the electric power network 200B. Further, it is possible to ensure a state in which voltage is controlled constant with respect to the interconnection lines.

Meanwhile, the method of operation at the time of occurrence of a failure according to the seventh embodiment and the eighth embodiment may be applied to various failures, such as short circuit or ground fault, in addition to disconnection.

Ninth Embodiment

Figure 10:
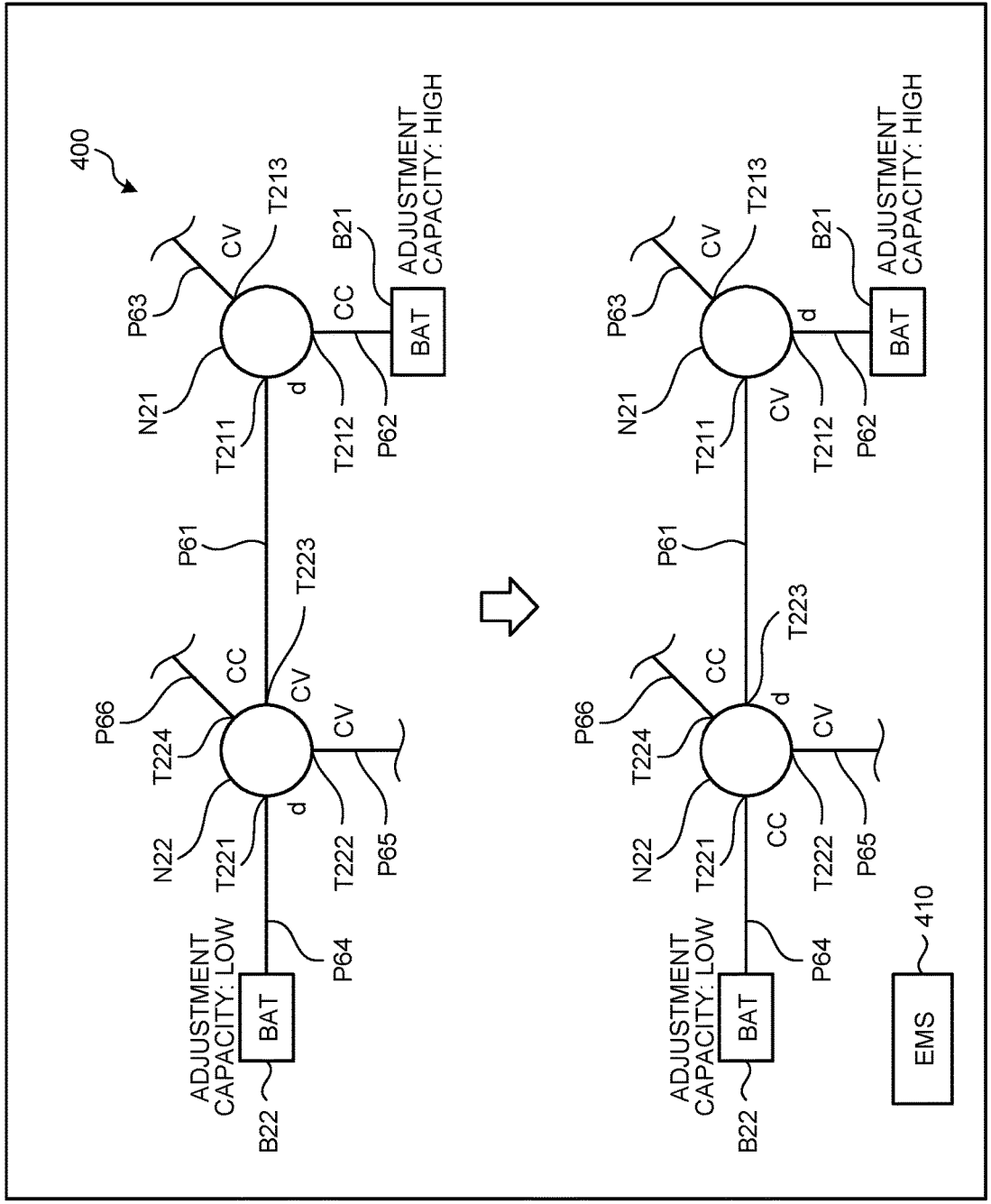
FIG. 10 is a diagram for explaining a method of switching setting of a power port according to a ninth embodiment.

A method of switching setting of a power port in accordance with a charge state of a power storage apparatus will be described below as one example of the method of changing an electric power network. FIG. 10 is a diagram for explaining a method of switching setting of a power port according to a ninth embodiment. An electric power network 400 illustrated in FIG. 10 includes a plurality of nodes each including a plurality of power ports, and a plurality of interconnection lines that connect the nodes in a grid manner via the power ports, similarly to the electric power network of the first embodiment. In FIG. 10, a node N21 and a node N22 are illustrated among the plurality of nodes and power paths P61, P62, P63, P64, P65 and P66 are illustrated among the plurality of interconnection lines. Further, the electric power network 400 includes batteries B21 and B22 and an EMS 410 that is able to control operation of all of the nodes. Each of the batteries B21 and B22 includes a BMS. The batteries B21 and B22 are one examples of a plurality of power storage apparatuses. The batteries B21 and B22 are one examples of the power storage apparatuses and are, for example, lithium ion batteries.

The power path P61 connects a power port T211 of the node N21 and a power port T223 of the node N22. The power path P62 connects a power port T212 of the node N21 and the battery B21. The power path P63 connects a power port T213 of the node N21 and a power port of a different node. The power path P64 connects a power port T221 of the node N22 and the battery B21. The power path P65 connects a power port T222 of the node N22 and a power port of a different node. The power path P66 connects a power port T224 of the node N22 and a power port of a different node.

In the electric power network 400, the EMS 410 interchanges the power ports T212 and T221, which are respectively connected to the batteries B21 and B22, between the d port and the control port in accordance with charge states of the batteries B21 and B22.

For example, the power port T212 is switched from the setting of the CC port as illustrated in an upper figure in FIG. 10 to the setting of the d port as illustrated in a lower figure. Further, the power port T212 is switched from the setting of the d port to the setting of the CC port. Furthermore, the power port T221 is switched from the setting of the d port as illustrated in the upper figure in FIG. 10 to the setting of the CC port as illustrated in the lower figure. Moreover, the power port T221 is switched from the setting of the CC port to the setting of the d port. The EMS 410 acquires information on the charge states of the batteries B21 and B22, where the charge states are obtained by the BMS, and performs switching as described above in accordance with the acquired charge states. The charge states are acquired by calculation performed by the arithmetic unit, by reference to table data stored in the storage unit, or the like. In the table data to be referred to, information on the charge states and a correspondence relationship with the charge states are stored.

The method according to the ninth embodiment will be described below with specific examples. In the upper diagram illustrate in FIG. 10, the battery B22 is connected to the d port and functions as a buffer. Further, the battery B21 is connected to the CC port. In this state, it is assumed that the battery B22 has a low adjustment capacity and the battery B21 has a high adjustment capacity.

Here, the adjustment capacity means a degree of capability as a buffer, and the large adjustment capacity means that the capability as the buffer is high. For example, in a certain battery, if the state of charge (SoC) that is one example of an index of the charge state is a certain value close to an upper limit value (for example, 100%), capability as a discharge buffer for discharging electric power is high, so that the adjustment capacity is high. If the SoC is a certain value close to a lower limit value (for example, 0%), capability as a charge buffer for charging electric power is low, so that the adjustment capacity is low. Further, if the SoC is away from the upper limit value and the lower limit value (for example, about 50%), the capabilities as the discharge buffer and the charge buffer are high. In the present embodiment, the EMS 410 determines that a battery with the SoC away from the upper limit value and the lower limit value, for example, a battery with the SoC closer to 50%, has a higher adjustment capacity. Furthermore, the EMS 410 determines that a battery with the SoC closer to the upper limit value or the lower limit value, for example, a battery with the SoC that is farther away from 50%, has a lower adjustment capacity.

If the EMS 410 determines, from the SoC that is acquired from the information obtained from the BMS, that the adjustment capacity of the battery B22 is lower than the adjustment capacity of the battery B21 (the SoC is closer to the upper limit value or the lower limit value), the EMS 410 switches the power port T221 connected to the battery B22 from the d port to the CC port and switches the power port T212 connected to the battery B21 from the CC port to the d port. Meanwhile, to perform switching while maintaining the function of the buffer of at least one of the batteries B21 and B22, it may be possible to first switch the power port T212 to the d port and thereafter switch the power port T221 to the CC port.

Furthermore, in the case illustrated in the upper figure in FIG. 10, when the power port T221 is set to the d port in the node N22, the power ports T222, T223, and T224 are set to the CV port, the CV port, and the CC port, respectively. In this case, if the power port T221 is switched to the CC port, the d port of the node N22 becomes absent. Therefore, to maintain the d port, it may be possible to first switch the power port T223 from the CV port to the d port and thereafter switch the power port T221 to the CC port. Moreover, in the case illustrated in the upper figure in FIG. 10, when the power port T212 is set to the CC port in the node N21, the power ports T211 and T213 are set to the d port and the CV port, respectively. In this case, if the power port T223 of the node N22 is switched to the d port, voltage stability of the power path P61 that is an interconnection line may be reduced. Therefore, to ensure the voltage stability of the power path P61, it may be possible to first switch the power port T211 from the d port to the CV port and thereafter switch the power port T223 to the d port.

Therefore, one example of order of switching the power ports may be as follows. Specifically, the power port T212 is first switched to the d port. Subsequently, the power port T211 is switched to the CV port. Then, the power port T223 is switched to the d port. Thereafter, the power port T221 is switched to the CC port.

According to the method of the ninth embodiment, it is possible to increase the adjustment capacity as a buffer in the battery that is a power storage apparatus while maintaining flexible power interchange in the electric power network 400.

Meanwhile, in the method according to the ninth embodiment, the EMS 410 determines that the battery for which the SoC is away from the upper limit value and the lower limit value between the batteries B21 and B22 has a high adjustment capacity, and the battery for which the SoC is closer to the upper limit value or the lower limit value has a low adjustment capacity, but the criterion for determining the adjustment capacity is not limited to this example. For example, the EMS 410 may determine that the battery for which an acquired remaining capacity is away from a maximum capacity and a minimum capacity between the batteries B21 and B22 has a large adjustment capacity. In this case, the remaining capacity of the battery is adopted as the index of the charge state. For example, if the batteries B21 and B22 have different maximum capacities, in some cases, it may be better to adopt the remaining capacities as the charge states. Further, if a plurality of batteries are provided, it may be possible to switch a certain power port that is connected to a battery with the lowest adjustment capacity from the d port to the CC port, or it may be possible to switch a certain power port that is connected to two or more batteries, for which adjustment capacities determined based on the index indicating the charge states are smaller than a predetermined criterion, from the d port to the CC port.

Furthermore, a determination condition under which the power port connected to the battery is switched from the d port to the CC port is not limited to the condition as described above. For example, the EMS 410 may perform control of maintaining the setting of the d port if the SoC of the battery connected to the power port that is the d port is within a predetermined range, and switching to the CC port if the SoC is out of the predetermined range. The predetermined range is, for example, a range in which a lower limit value is set to 20% or 30% and an upper limit value is set to 70% or 80%, but a different range may be adopted depending on a battery. Moreover, it may be possible to perform the switching control in accordance with determination on whether the remaining capacity is in or out of a predetermined range, instead of the SoC.

Furthermore, the EMS 410 may acquire electric power generation/demand forecast information on the electric power network 400 from a different EMS or an external server. The electric power generation/demand forecast information includes forecast information on a power generation capacity in the electric power network 400 or demand forecast information on electric power. For example, if the electric power network 400 includes a PV apparatus, information on a season, current weather, or a weather forecast of a region in which the PV apparatus is installed may be included. Moreover, for example, if the electric power network 400 includes a battery that is mounted on an electrified vehicle, such as an electric vehicle or a hybrid vehicle, information on a need of electric power by the electrified vehicle may be included.

The EMS 410 may change the criterion for determining magnitude of the adjustment capacity on the basis of the acquired electric power generation/demand forecast information. For example, if information on a forecast indicating that the power generation capacity will increase in the future is obtained, it is desired that a buffer has a large chargeable power amount; therefore, it may be possible to determine a battery for which the SoC is closer to the lower limit value as the battery with a large adjustment capacity. Furthermore, for example, if information on a forecast indicating that a demand of electric power will increase in the future is obtained, it is desired that a buffer has a large dischargeable power amount. Therefore, it may be possible to determine a battery for which the SoC is closer to the upper limit value as the battery with a large adjustment capacity. The EMS 410 changes the determination criterion as described above based on calculation performed by the arithmetic unit or by reference to the table data stored in the storage unit, for example.

Moreover, the EMS 410 may change the predetermined range of the index (for example, SoC), which is set for switching between the power ports, on the basis of the acquired electric power generation/demand forecast information.

Furthermore, in the method according to the ninth embodiment, the power port connected to the battery is switched between the d port and the CC port, but may be switched between the d port and the CV port that is a control port.

Moreover, in the method according to the ninth embodiment, setting of the power ports is switched in accordance with the charge states of the batteries B21 and B22 that are connected to the power routers of the different nodes. However, as another method according to the embodiment, it may be possible to switch the setting of power ports in accordance with the charge state of each of batteries that are connected to different power ports of a power router of a single node.

Furthermore, the input-output port (for example, the input-output port 15a1) that is set as the CV port in FIG. 1A and FIG. 1B may be subjected to droop control such that a relationship between voltage and electric power to be output and input at the side of the DC bus 12 follows a reference function that has a predetermined droop (drooping) characteristics. Here, the "droop characteristics" indicate drooping characteristics, which are characteristics in which a relationship between voltage and an output/input amount of electric power includes a certain relationship other than a relationship in which the output/input amount of electric power is constant over a predetermined voltage range and a relationship in which the voltage is constant over a predetermined range of the output/input amount of electric power.

Figure 11:
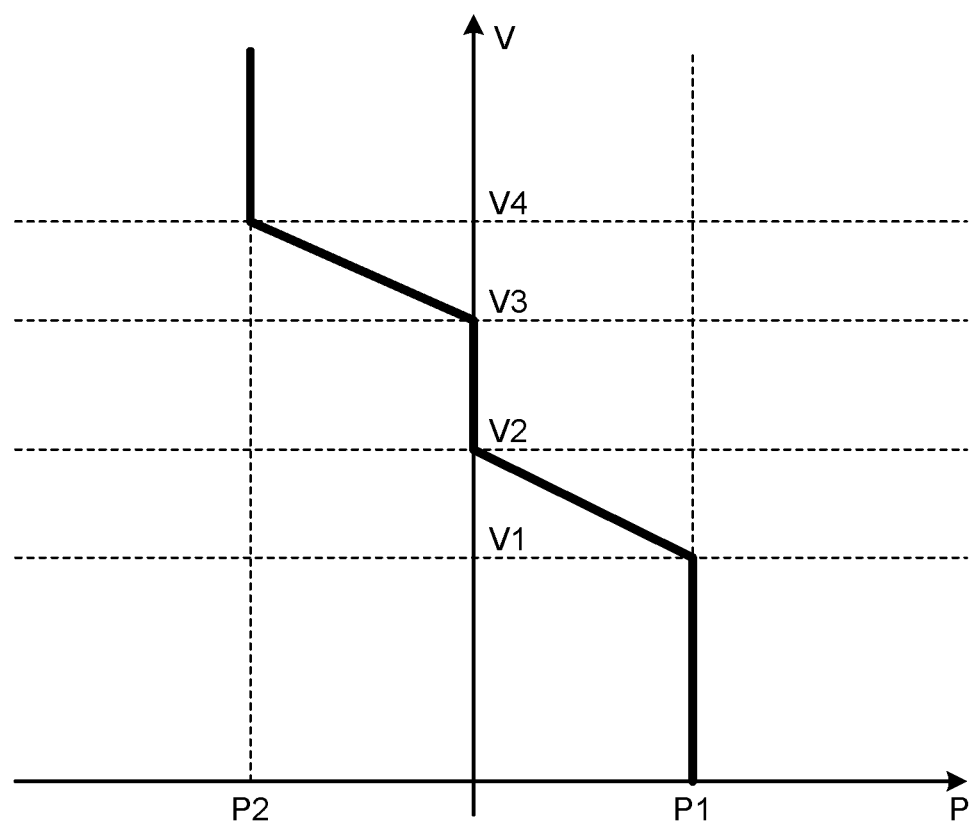
FIG. 11 is a diagram for explaining one example of droop control.

For example, FIG. 11 is a diagram for explaining one example of droop control on the input-output port 15a1. If voltage at the side of the DC bus 12 is between V2 and V3, the microgrid 10 is in a normal state in which power supply and demand is average, and the reference function is set such that the battery 15b is not charged and discharged (P=0).

Furthermore, if the voltage at the side of the DC bus 12 is between V1 and V2, the microgrid 10 is in a first semi-normal state in which a power demand is larger than the normal state and the voltage is reduced, and the reference function is set such that the droop control is performed so as to cause the battery 15b to discharge at a relatively large droop coefficient. In contrast, if the voltage at the side of the DC bus 12 is between V3 and V4, the microgrid 10 is in a second semi-normal state in which the power demand is smaller than the normal state and the voltage is increased, and the reference function is set such that the droop control is performed so as to cause the battery 15b to discharge at a relatively large droop coefficient.

Moreover, if the voltage at the side of the DC bus 12 is smaller than V1, the microgrid 10 is in an excess state in which the power demand is further increased as compared to the first semi-normal state, and the reference function is set such that the battery 15b discharges at predetermined maximum power P1. In contrast, if the voltage at the side of the DC bus 12 exceeds V4, the microgrid 10 is in an excess state in which the power demand is further reduced as compared to the second semi-normal state, and the reference function is set such that the battery 15b is charged at predetermined maximum power |P2|.

Furthermore, in the electric power network of the embodiments as described above, if any of the nodes includes the configuration of the microgrid 10 or the microgrid 10A, the EDLC 13b and the batteries 14b, 15b, and 16b are connected to the d ports in the microgrid 10, so that the entire microgrid 10 functions as the power storage apparatus. Moreover, similarly to the microgrid 10A, it may be possible to connect the d port of any of the nodes to a power system of an electric power company and adjust a difference between an inflow amount and an outflow amount of electric power by receiving power or selling power.

According to the disclosure, at least one of power ports of each of a plurality of power routers is set as a dependent port for which characteristics of direct-current power to be input and output are not controlled. As a result, each power router is able to adjust, by the dependent port, a difference between an inflow amount and an outflow amount of electric power, so that it is possible to provide an electric power network that is suitable for flexible power interchange. Furthermore, according to the disclosure, at least one of the power ports of each of the plurality of power routers is set as the dependent port for which characteristics of direct-current power to be input and output are not controlled, operation of at least two of the power routers in relation to a power port to be connected with an interconnection line among the power ports of each of the at least two of the power routers is stopped, operation of the at least two of the power routers in relation to a power port other than the power port to be connected is maintained, and an additional power router is connected, with the interconnection line, to the power port to be connected. As a result, it is possible to adjust, by the dependent port, a difference between an inflow amount and an outflow amount of electric power in the power router and it is possible to maintain the operation of the power router related to the power port other than the power port to be connected, so that it is possible to provide an electric power network changing method that is suitable for flexible power interchange and that is able to prevent interruption of operation.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electric power network comprising:
a plurality of power routers each including a plurality of power ports, each power port being capable of inputting and outputting direct-current power, each power router being configured to convert electric power input from any of the power ports of the power router and to output the converted electric power from at least one of remaining power ports of the power router;
a plurality of interconnection lines configured to connect the power routers in a grid manner via the power ports; and
an electric power apparatus configured to consume or supply electric power, the electric power apparatus being connected to a power port that is included in at least one of the power routers and that is not connected to any of the interconnection lines, wherein
at least one of the power ports of each of the power routers is set as a dependent port for which characteristics of direct-current power to be input or output are not controlled,
the plurality of power routers include
at least one first power router including at least one dependent port connected to a power storage apparatus that is able to store and discharge direct-current power, and
at least one second power router that is unconnected to a power storage apparatus that is able to store and discharge direct-current power, and
the at least one second power router includes a dependent port connected to a first constant voltage control port that is set as a port for which voltage of direct-current power to be input or output is controlled constant in a predetermined range among the power ports of another power router of the plurality of power routers.

2. The electric power network according to claim 1, wherein the dependent port that is included in at least one of the power routers is connected to a second constant voltage control port that is set as a port for which voltage of direct-current power to be input or output is controlled constant in a predetermined range among the power ports that are included in at least one of other power routers.

3. The electric power network according to claim 1, wherein
a power port that is included in at least one of the power routers is a third constant voltage control port that is set as a port for which voltage of direct-current power to be input or output is controlled constant in a predetermined range, and
the third constant voltage control port is connected to a constant current control port that is set as a power port for which an electric current of direct-current power to be input or output is controlled constant in a predetermined range among the power ports of another power router.

4. The electric power network according to claim 1, further comprising:
a controller configured to control operation of at least one of the power routers.

5. An electric power network comprising:
a plurality of power routers each including a plurality of power ports, each power port being capable of inputting and outputting direct-current power, each power router being configured to convert electric power input from any of the power ports of the power router and to output the converted electric power from at least one of remaining power ports of the power router;
a plurality of interconnection lines configured to connect the power routers in a grid manner via the power ports;
an electric power apparatus configured to consume or supply electric power, the electric power apparatus being connected to a power port that is included in at least one of the power routers and that is not connected to any of the interconnection lines; and
a controller configured to control operation of at least one of the power routers, wherein
at least one of the power ports of each of the power routers is set as a dependent port for which characteristics of direct-current power to be input or output are not controlled, and
the controller is configured to mutually switch at least one of the power ports of the at least one of the power routers between the dependent port and a control port that is set as a port for which characteristics of direct-current port to be input or output are controlled.

6. An electric power network comprising:
a plurality of power routers each including a plurality of power ports, each power port being capable of inputting and outputting direct-current power, each power router being configured to convert electric power input from any of the power ports of the power router and to output the converted electric power from at least one of remaining power ports of the power router;
a plurality of interconnection lines configured to connect the power routers in a grid manner via the power ports;
an electric power apparatus configured to consume or supply electric power, the electric power apparatus being connected to a power port that is included in at least one of the power routers and that is not connected to any of the interconnection lines; and
a controller configured to control operation of at least one of the power routers, wherein
at least one of the power ports of each of the power routers is set as a dependent port for which characteristics of direct-current power to be input or output are not controlled,
the plurality of power routers include a plurality of third power routers connected to power storage apparatuses, each power storage apparatus being able to store and discharge direct-current power, each third power router including the power ports, one power port of each third power router being connected to a corresponding one of the power storage apparatuses, and
the controller is configured to mutually switch the power ports of the plurality of third power routers, which are connected to the respective power storage apparatuses, between a dependent port and a control port in accordance with a charge state of each of the power storage apparatuses.

7. An electric power network comprising:
a plurality of power routers each including a plurality of power ports, each power port being capable of inputting and outputting direct-current power, each power router being configured to convert electric power input from any of the power ports of the power router and to output the converted electric power from at least one of remaining power ports of the power router;
a plurality of interconnection lines configured to connect the power routers in a grid manner via the power ports;
an electric power apparatus configured to consume or supply electric power, the electric power apparatus being connected to a power port that is included in at least one of the power routers and that is not connected to any of the interconnection lines; and
a controller configured to control operation of at least one of the power routers, wherein
at least one of the power ports of each of the power routers is set as a dependent port for which characteristics of direct-current power to be input or output are not controlled,
the plurality of power routers include a plurality of third power routers connected to power storage apparatuses, each power storage apparatus being able to store and discharge direct-current power, each third power router including the power ports, one power port of each third power router being connected to a corresponding one of the power storage apparatuses, and
the controller is configured to switch the power port that is connected to a power storage apparatus for which an index indicating a charge state is close to one of an upper limit value and a lower limit value among the power storage apparatuses, from a dependent port to a control port.

8. The electric power network according to claim 4, wherein the controller is configure to control operation of at least two of the power routers.

9. The electric power network according to claim 8, wherein
the controller is configured to:
stop operation of the at least two of the power routers to a power port to be connected with an interconnection line among the power ports of each of the at least two power routers, and
maintain operation of the at least two power routers to a power port other than the power port to be connected.

10. The electric power network according to claim 9, wherein when the power port to be connected is the dependent port, the controller is configured to stop operation of the power router to the dependent port and set at least one of the power ports other than the power port to be connected, to a dependent port.

11. An electric power network comprising:
a plurality of power routers each including a plurality of power ports, each power port being capable of inputting and outputting direct-current power, each power router being configured to convert electric power input from any of the power ports of the power router and to output the converted electric power from at least one of remaining power ports of the power router;
a plurality of interconnection lines configured to connect the power routers in a grid manner via the power ports;
an electric power apparatus configured to consume or supply electric power, the electric power apparatus being connected to a power port that is included in at least one of the power routers and that is not connected to any of the interconnection lines; and
a controller configured to control operation of at least one of the power routers, wherein at least one of the power ports of each of the power routers is set as a dependent port for which characteristics of direct-current power to be input or output are not controlled, the controller is configure to control operation of at least two of the power routers, and when a failure occurs in at least one interconnection line of the interconnection lines and the controller determines that a power port connected to the interconnection line in which the failure has occurred is the dependent port, the controller is configured to switch at least one of remaining power ports of the power router including the dependent port to a dependent port.

12. The electric power network according to claim 11, wherein when a power port that is included in a different power router and that is connected to an interconnection line connected to the power port that has been switched to the dependent port is not a constant voltage control port, the controller is configured to switch the power port included in the different power router to a constant voltage control port.

13. A method of changing an electric power network that includes a plurality of power routers each including a plurality of power ports, each power port being capable of inputting and outputting direct-current power, each power router being configured to convert electric power input from at least one of the power ports of the power router and to output the converted electric power from at least one of other power ports of the power router, a plurality of interconnection lines configured to connect the power routers in a grid manner via the power ports, and an electric power apparatus configured to consume or supply electric power, the electric power apparatus being connected to a power port and that is included in at least one of the power routers and that is not connected to any of the interconnection lines, at least one of the power ports of each of the power routers being set as a dependent port for which characteristics of direct-current power to be input or output are not controlled, the plurality of power routers including at least one first power router including at least one dependent port connected to a power storage apparatus that is able to store and discharge direct-current power, and at least one second power router that is unconnected to a power storage apparatus that is able to store and discharge direct-current power, the at least one second power router including a dependent port connected to a first constant voltage control port that is set as a port for which voltage of direct-current power to be input or output is controlled constant in a predetermined range among the power ports of another power router of the plurality of power routers, the method comprising:

stopping operation of at least two of the power routers to a power port to be connected with an interconnection line among the power ports of each of the at least two of the power routers;

maintaining operation of the at least two of the power routers to a power port other than the power port to be connected; and connecting the power port to be connected and an additional power router with the interconnection line.

14. The method according to claim 13, further comprising:

stopping, if the power port to be connected is the dependent port, operation of the power router to the dependent port; and setting at least one of the power ports other than the power port to be connected, to a dependent port.

15. A method of changing an electric power network that includes a plurality of power routers each including a plurality of power ports, each power port being capable of inputting and outputting direct-current power, each power router being configured to convert electric power input from at least one of the power ports of the power router and to output the converted electric power from at least one of other power ports of the power router, a plurality of interconnection lines configured to connect the power routers in a grid manner via the power ports, and an electric power apparatus configured to consume or supply electric power, the electric power apparatus being connected to a power port and that is included in at least one of the power routers and that is not connected to any of the interconnection lines, at least one of the power ports of each of the power routers being set as a dependent port for which characteristics of direct-current power to be input or output are not controlled, the method comprising:

switching, when a failure occurs in at least one interconnection line of the interconnection lines and the controller determines that a power port connected to the interconnection line in which the failure has occurred is the dependent port, at least one of remaining power ports of the power router including the dependent port to a dependent port.

16. The method according to claim 15, wherein the switching includes, when a power port that is included in a different power router and that is connected to an interconnection line connected to the power port that has been switched to the dependent port is not a constant voltage control port, switching the power port included in the different power router to a constant voltage control port.

17. A method of changing an electric power network that includes a plurality of power routers each including a plurality of power ports, each power port being capable of inputting and outputting direct-current power, each power router being configured to convert electric power input from at least one of the power ports of the power router and to output the converted electric power from at least one of other power ports of the power router, a plurality of interconnection lines configured to connect the power routers in a grid manner via the power ports, and an electric power apparatus configured to consume or supply electric power, the electric power apparatus being connected to a power port and that is included in at least one of the power routers and that is not connected to any of the interconnection lines, at least one of the power ports of each of the power routers being set as a dependent port for which characteristics of direct-current power to be input or output are not controlled, each of the power ports of the at least one of the power routers being connected to each of power storage apparatuses, each power storage apparatus being able to store and discharge direct-current power, the method comprising:
mutually switching the power ports that are connected to the respective power storage apparatuses between a dependent port and a control port in accordance with a charge state of each of the power storage apparatuses.

18. The method according to claim 16, wherein the switching includes switching the power port that is connected to a power storage apparatus for which an index indicating a charge state is close to one of an upper limit value and a lower limit value among the power storage apparatuses, from the dependent port to the control port.

* * * * *